United States Patent [19]

Ogawa

[11] Patent Number: 4,788,607
[45] Date of Patent: Nov. 29, 1988

[54] TAPE WINDING END DETECTING DEVICE OF TAPE RECORDER

[75] Inventor: Hisashi Ogawa, Tokyo, Japan

[73] Assignee: Shinwa Kabushiki Kaisha, Tokyo, Japan

[21] Appl. No.: 100,037

[22] Filed: Sep. 23, 1987

[30] Foreign Application Priority Data

Oct. 3, 1986 [JP] Japan .................. 61-235767

[51] Int. Cl.$^4$ .................. G11B 15/18; G11B 15/32
[52] U.S. Cl. .................. 360/74.2
[58] Field of Search .................. 360/74.1, 74.2, 69, 360/71, 73, 96.3, 137

[56] References Cited

U.S. PATENT DOCUMENTS 4,227,223 10/1980 Magata et al. .................. 360/74.1 X
4,511,103 4/1985 Hayashi et al. .................. 360/74.2 X
4,604,662 8/1986 Ida et al. .................. 360/74.1

Primary Examiner—John H. Wolff
Attorney, Agent, or Firm—James E. Nilles

[57] ABSTRACT

A tape winding end detecting device of a tape recorder wherein a reduced speed rotary body is arranged in a driving system from pair of reel mountings to an electric motor, a cam is provided on the rotary body, a switching lever is engaged to the cam so as to move a lock lever for holding operation levers of a tape recorder in accordance with the stopping of the rotation of the reel mounting and to release the operation levers, and an electric motor switch operation member is engaged to the cam in such a manner that the return timing of the electric motor switch operation member is arranged to be delayed relative to the return timing of the lock lever.

2 Claims, 5 Drawing Sheets

TAPE WINDING END DETECTING DEVICE OF TAPE RECORDER

BACKGROUND OF THE INVENTION

1. Field of the Invention

This invention relates to a tape winding end detecting device, and relates to a device which detects a winding finish of a tape to restore an operation lever and also stop an electric motor.

2. Description of the Prior Art

A device of a tape recorder of such a type is known in which a rotary system in which a speed is reduced is provided individually from a driving system from an electric motor to a reel mounting, and a rotary body which detects the rotation of the reel mounting is provided in the rotary system in such a manner that a member which is moved by the rotary body stops the electric motor and restores an operation lever.

In the aforesaid conventional tape recorder, however, a rotary body which detects the rotation of the reel is necessitated to be provided for the speed reduced rotary system which is provided individually from the driving system which rotates the reel, as a result of which, the structure of the device becomes complicated, which leads problem in difficulty to make the device compact and high cost.

Further, the structure which restore the operation lever of such a device raises a problem in which a member which locks the operation lever is stopped at a position where the member releases locking and makes a unlocking state, which leads the fact that the operation lever is impossible to be locked before the locking member returns to the locking state when the operation lever is intended to be operated.

SUMMARY OF THE INVENTION

An object of the present invention is to overcome the aforesaid problems. An object of the present invention is as well to provide a tape winding finish detecting device of a tape recorder displaying a simple structure because a cam which is provided in a driving system detects rotation of a reel mounting, as a result of which, size can be made compact and assembling can be facilitated.

In a tape recorder according to the present invention in which a plurality of operation levers are provided for the purpose of being selected. The state of the operation by the selected lever is kept by a lock lever. And this operation lever operates a starting switch operation member for an electric motor so as to start this electric motor. The actuation of this electric motor causes reel mountings to be rotated by selective engagement of gears corresponding to the aforesaid selected operating lever. The rotation of the reel mountings causes a tape to be wound. By detecting the stop of rotation of the reel mountings at the time of finising winding the tape, the aforesaid lock lever is released, and the selected operation lever is returned and the starting switch operation member for the electric motor is released. The tape winding finish detecting device comprising a cam which is provided on a rotary body whose rotational speed is reduced arranged in a driving system from said electric motor to said pair of reel mountings. Furthermore it comprises a switching lever which is actuated in accordance with the stop of rotation of said reel mountings, and which shifts the aforesaid lock lever. The aforesaid starting switch operation member for the electric motor is engaged to the aforesaid cam. And the return timing of this starting switch operation member of the electric motor is delayed with respect to the return timing of the lock lever by the cam which is formed on one rotary body in the driving system.

The selectively operation of the operation levers of the tape winding finish detecting device according to the present invention causes the lock lever to be moved. The operative state of the selected operation lever is kept by the lock lever. And the switch operation member is actuated by this operation lever. This switch operation member then turns on the starting switch for the electric motor to start the electric motor. The driving system which is continued to the reel mountings are rotated. The rotation of this driving system and engagement of gears in accordance with the mode selected by the operation lever causes the reel mountings to be selectively rotated. As a result of this, a tape in a cassette is wound by either one of the reel mountings in the winding direction. The rotation of the reel mountings at the time of winding the tape in a selected mode causes a switching lever to be rotated. The switching lever is then moved and brought into engagement with the cam. The finish of winding the tape is not detected by this cam. When the tape is wound up to its end by the reel mounting in the winding direction, the rotation of this reel mounting is stopped rotating by slippage of a clutch. In this case, the cam detects the tape winding finish and operates the switching lever. Thus the switching lever is operated so as to push and move the lock lever. As a result of this, the operation lever is relesed and returned, but the switch operation member is engaged to the cam, and the switch operation member is not returned. As a result of this, the switch operation member for the electric motor is kept to be turned on, and the electric motor therefore keeps its rotation. Further rotation of the cam causes the switching lever to operate, and still further rotation of the cam makes connection of it with the switching lever release so as to return the switching lever. Furthermore, the rotation of the cam makes the switch operating member return, then the starting switch for the electric motor is turned off so as to stop the electric motor.

The further objects and characteristics of this invention can be made clear with reference to the following drawings.

PREFFERRED EMBODIMENT OF THE INVENTION

Figure 1:
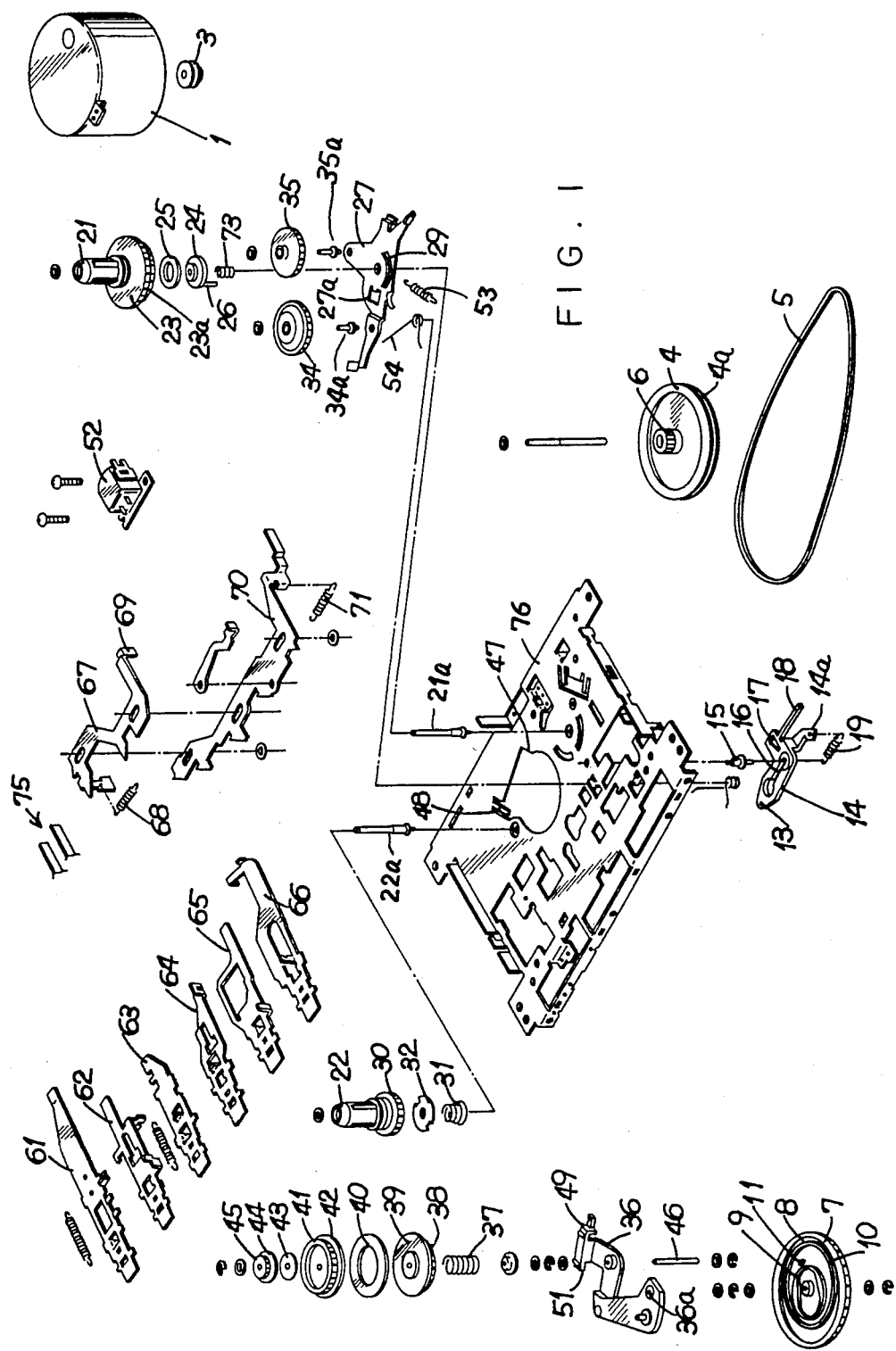
FIG. 1 is a perspective exploded view illustrating one embodiment of a tape winding finish detecting device of a tape recorder according to the present invention.

A belt 5 is arranged between a pulley 3 which is provided on a driving shaft of an electric motor 1 and a pulley portion 4a of a flywheel 4 so as to connect the aforesaid electric motor 1 and the flywheel 4 by means of the belt. A cam 8 is integrally formed on one side surface of a main gear 7 which is formed in a rotary body and which is engaged with a gear 6 which is formed integrally with the flywheel 4. This main gear 7 is adapted to be rotated at a lowest speed as possible.

This cam 8 has a large and a small cam projecting edges 9 and 10 which are formed in a circular shape and which are provided in an eccentric manner with the aforesaid main gear 7. These cam projecting edges 9 and 10 are formed in an eccentric manner each other, and a projection 11 is formed at a position of a wide interval between these cam projecting edges 9 and 10. An engaging groove 16 which rotatably and movably secures a shaft 15 is formed in a switching lever 14 in which an engaging portion 13 such as a tab which is adapted to be engaged to the projection 11 of the cam 8 is formed. An engaging hole 17 is formed in this switching lever 14, and an elastic member 18 is integrally projecting on this switching lever 14. And this switching lever 14 is urged by means of a spring 19 in the direction in which aforesaid engaging portion 14 is engaged to the projection 11 of the cam 8.

Reference numerals 21 and 22 represent reel mountings each having gears 23 and 30 integrally formed thereon. A rotary operation plate 24 which is forced by a spring 73 which forms a clutch is abutted against the bottom surface of one of reel mountings 21 through a friction plate 25. An engaging pin 26 which is adapted to be engaged to the engaging hole 17 in the aforementioned switching lever 14 is provided on this rotary operation plate 24. One of the reel mountings 21 with the clutch friction plate 25 and the rotary operation plate 24 is rotatably secured to a switching operation plate 27 by means of a shaft 21a. The aforesaid engaging pin 26 is engaged into the engaging hole 17 formed in the aforesaid switching lever 14 through a guide hole 29 in this switching operation plate 27. The other reel mounting 22 is rotatably secured by a shaft 22a through a friction plate 32 which is pressed by a spring 31 which forms a clutch.

Further, a fast forward gear 35 which is engaged with a gear 23a which is integrally formed with the gear 23 of a reel mounting 21 and a playback gear 34 are rotatably secured to the aforementioned switching operation plate 27 by means of shafts 34a and 35a, respectively. The aforesaid main gear 7 is rotatably secured to a center of rotation 36a of a switching rotary plate 36. A rotary plate 39 having a driving gear 38 which is adapted to be engaged with the above main gear 7, a clutch friction plate 40 such as a felt, a rotary plate 42 having a fast forward main gear 41 and a playback gear 45 having a clutch friction plate 43 and a rotary plate 44 are in sequence rotatably secured to this switching rotary plate 36 through a spring 37 by means of a shaft 46. This fast forward main gear 41 is detachably engaged to the gear 30 of the other reel mounting 22 mentioned above and to the fast forward gear 35 which is provided for the aforementioned switching operation plate 27. The playback gear 45 is detachably engaged with the playback gear 34 which is provided for the aforesaid switching operation plate 27.

A regulating portions 49 and 51 which are adapted to be respectively detachably engaged to edges of regulating portions 47 and 48 which are formed in a device mounting 76 are formed on the aforesaid switching rotary plate 36. The aforesaid flywheel 4, switching lever 14, switching operation plate 27, switching rotary plate 36 and reel mountings 21 and 22 are mounted on this device mounting 76.

A releasing operation portion 14a is further formed in the aforesaid switching lever 14.

The aforesaid switching operation plate 27 is forced by a spring 53 which is engaged to an engaging portion 27a thereof in the direction where the engagement between the fast forward gear 35 and the aforesaid fast forward main gear 41 is released.

Reference numeral 52 represents a head, a pinch roller which is omitted from illustration and this head 52 are adapted to be moved forward or rearward.

Operation levers such as recording operation lever 61, playback lever 62, fast reverse (rewinding) lever 63, fast forward lever 64, stop/reject lever 65 and a pause lever 66 are provided in a freely movably manner for the above device mounting 76. By means of the playback lever 62, fast reverse lever 63 and fast forward lever 64, a starting switch operation member 67 of the aforesaid electric motor 1 is actuated. This switch operation member 67 is forced by a spring 68 in the direction where a switch 75 is opened. One end projection 69 of this switch operation member 67 is adapted to be engaged on the inside of the cam projection edge 9 on the inside of the aforesaid cam 8. The operative state of the aforesaid playback lever 62, fast reverse lever 63 and the fast forward lever 64 is kept by a lock lever 70 which is forced by means of a spring 71 in the lock direction, and the movement of this lock lever 70 is released by means of a releasing operation portion 14a of the aforesaid switching lever 14 and stop/inject lever 65.

The driving system of the synchronizing mechanism from the electric motor 1 to the reel mountings 21 and 22 is formed by the flywheel 4, belt 5, main gear 7, driving gear 38, fast forward main gear 41 and playback gear 45. These driving gear 38, fast forward main gear 41 and a playback gear 45 are connected in a clutch manner.

This playback gear 45 is engaged with the gear 23 of the reel mounting 21 through the playback gear 34, and the fast forward main gear 41 is engaged with the gear 23a of the reel mounting 21 through the fast forward gear 35, and the fast forward main gear 41 is engaged with the gear 30 of the reel mounting 22.

Operation of the device in this embodiment will now be described.

Figure 10:
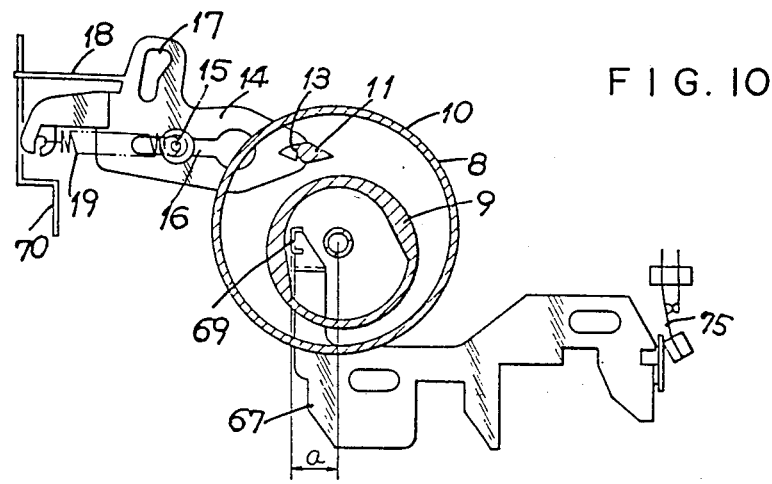
FIGS. 10 to 12 are views explaining the cam and a switch operation member.

In a playback mode, when the playback lever 62 is operated, the lock lever 70 is moved so as to keep the operation state of the playback lever 62 by means of the lock lever 70. And the switch operation member 67 is operated by means of this playback lever 62. At this time, the projection portion 69 of the switch operation member 67 is positioned at the distance a from the center of the cam 8 in the portion adjacent to the center from the inside cam projection edge 9 of the cam 8. The electric motor starting switch 75 is turned on by means of this switch operation member 67 (See FIG. 10) so as to start the electric motor 1, and the flywheel 4 is rotated by means of the belt 5. The rotation of the flywheel 4 causes the gear 6 and the main gear 7 to be engaged and causes this main gear 7 and the driving gear 38 to be engaged, as a result of which, the driving gear 38 is rotated.

Figure 2:
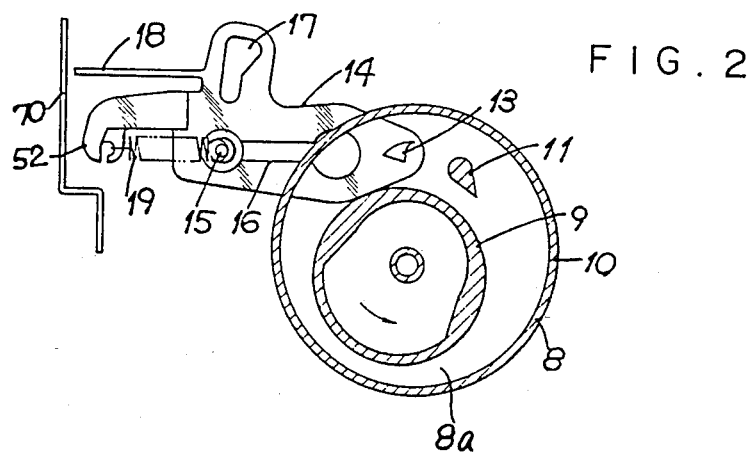
FIGS. 2 to 9 are views explaining a cam of the aforementioned device.
Figure 3:
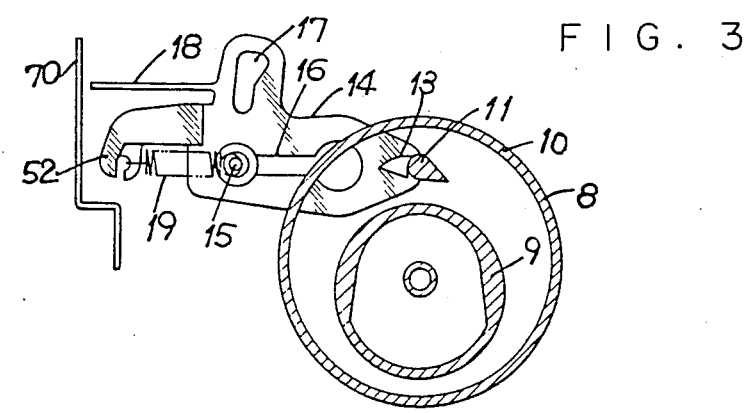
Figure 4:
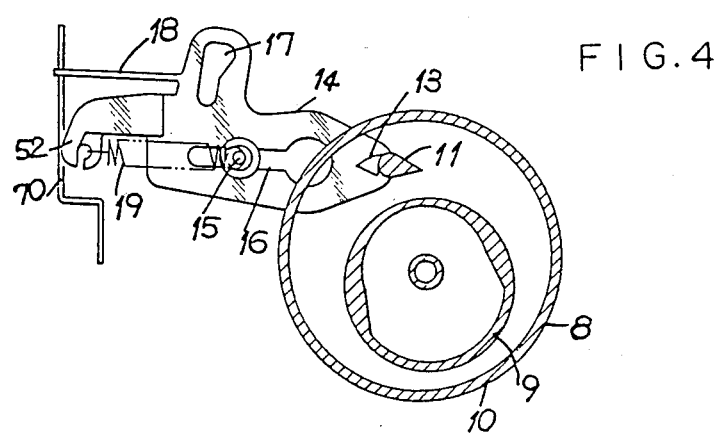
Figure 5:
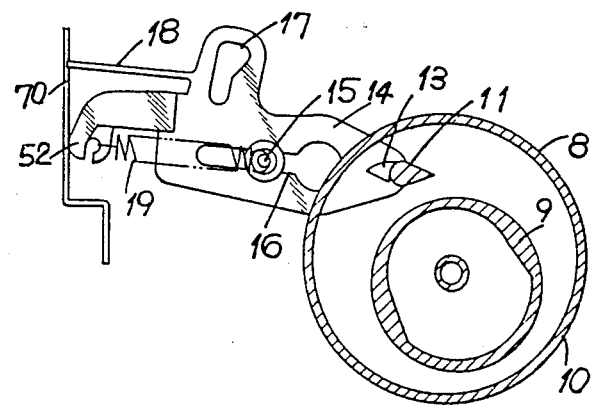
Figure 6:
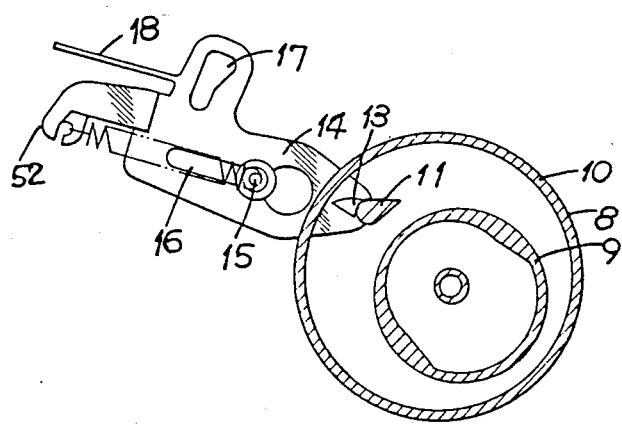
Figure 7:
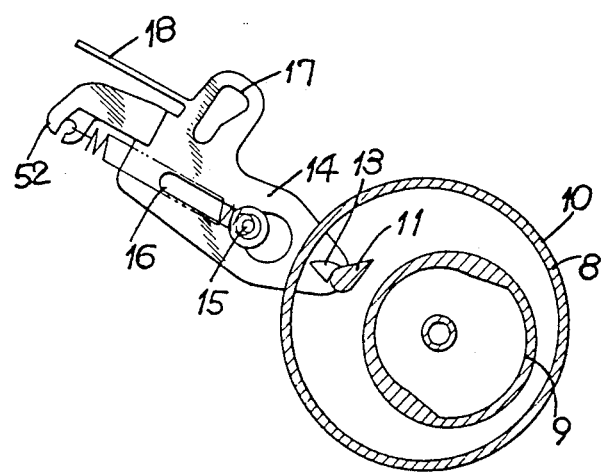
Figure 8:
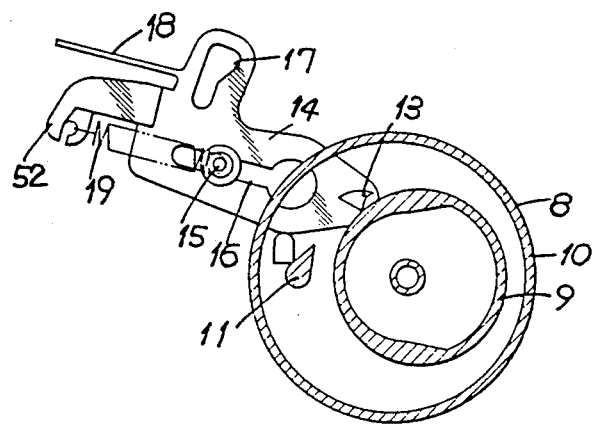
Figure 9:
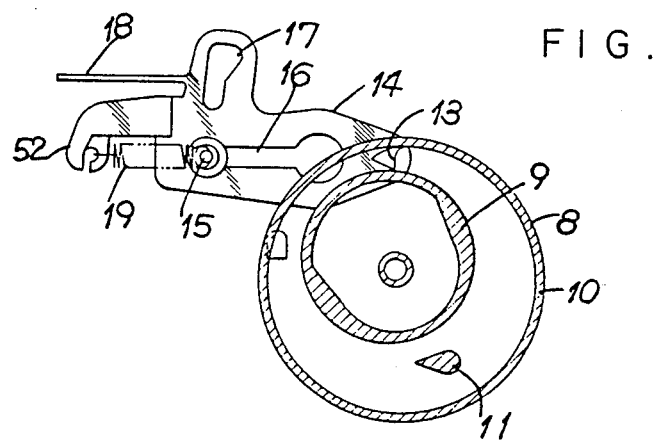
Figure 11:
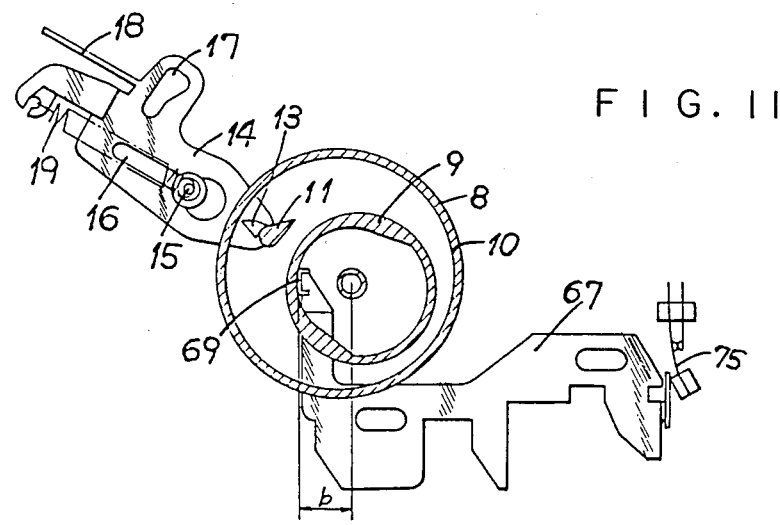
Figure 12:
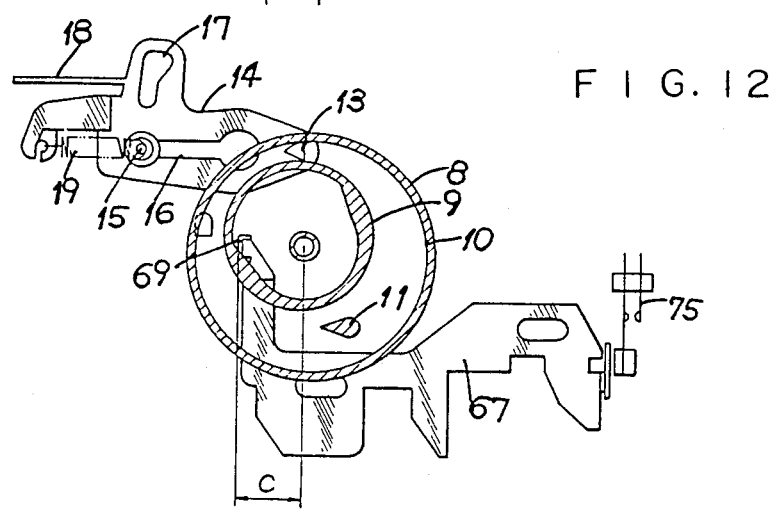

At this time, the head 52 and the pinch roller are moved forward by way of operation of the aforesaid playback lever 62. Since, the playback gear 45 and the playback gear 34 of the switching operation plate 27 are brought into engagement by way of rotation of the switching operation plate 27 by means of the spring 53 in accordance with the operation of the head mounting which is omitted from illustration to which the head 52 is secured, this engagement between the playback gear 34 and the gear 23 of one of the reel mountings 21 causes the reel mounting 21 to be rotated. As a result of this, the tape in the cassette recorder is wound by one of the reel mountings 21 by the length fed at a constant speed by the capstan and pinch roller. When the reel mounting 21 is rotated at the time of the tape being wound in this playback mode, the rotary operating plate 24 is rotated, and the switching lever 14 whose engaging hole 17 is engaged with the pin 26 is rotated with respect to the shaft 15 in the counterclockwise direction in FIG. 1. The engaging portion 13 of this switching lever 14 is moved and brought into contact with the outer peripheral surface of the cam projection 9 on the inside of the cam 8 without any contact with the engaging projection 11 of the cam 8. When the tape is wound up to its end by one of the reel mountings 21, this reel mounting 21 is stopped by way of slippage of the clutch friction plate 43, and the rotation of the rotary operation plate 24 is also stopped. In this state, the engaging portion 13 is moved and brought into contact with the outer peripheral surface of the cam projection end 9 on the inside of the cam 8. The switching lever 14 is so rotated that the engaging portion 13 of the switching lever 14 is located at the predetermined position at which this portion is engaged to the projection 11 of the cam 8 in the portion in which the distance between two cam projection edges 9 and 10 is shortest. The engaging portion 13 is engaged at the position as it is without any concern with the rotation of the cam 8 which has been continuously rotated. The cam 8 is rotated with the engaging portion 13 positioned between two cam projections edges 9 and 10 (See FIG. 2), the projection of the cam 8 is brought into contact with the engaging portion 13 of the switching lever 14 by the further rotation of the cam 8 (See FIG. 3), and this switching lever 14 is pressed against the spring force of the spring 19 (See FIG. 4), as a result of this, the releasing operation portion 14a of this switching lever 14 presses the lock lever 70 against the spring force of the spring 71 so as to release the lock lever 70 and so as to be restored by the spring 71. The projection portion 69 of the switch operation member 67 is engaged to the inside of the cam projection edge 9 of the cam 8 and is engaged at a distance b from the center of the cam 8 (See FIG. 11), and the switch operation member 67 is not returned by the spring 68, as a result of which, the electric motor starting switch 75 is kept at turning on state so as to make the electric motor 1 continue its rotation. The further rotation of the cam 8 makes the switching lever 14 rotate with the engaging portion 13 engaged to the projection 11 (See FIGS. 5 to 7). The further rotation of the cam 8 makes the switching lever 14 rotate to the releasement of engagement between the projection 11 and the engaging portion 13 of the switching lever 14. When the engagement between the engaging portion 13 and the projection 11 is released, the switching lever 14 is returned by the spring 19 (See FIG. 8), and the further rotation of the cam 8 makes the projection 69 shift at c distant from the center of the cam 8 inside of cam projection end 9 of the cam 8, as a result of which, the switch operation member 67 is returned by the spring 68 (See FIGS. 9 and 12), the electric motor starting switch 75 is thus turned off, as a result of which, the electric motor 1 is stopped.

In the fast forward mode, the lock lever 70 is moved in the similar manner to that in the playback mode by operation of the fast forward lever 64. As a result of this, the state of the fast forward lever 64 is kept, and as well the switch operation member 67 is operated. This switch operation member 67 turns on the electric motor starting switch 75 and the electric motor 1 is started. The operation of the fast forward lever 64 makes the switching operation plate 27 rotate by way of the spring 54. The fast forward gear 35 is thus engaged with the fast forward main gear 41. Since the fast forward gear 35 is engaged with the gear which is intergrally formed with the gear 23 of one of the reel mountings 21, the rotation of the driving gear 38 makes one of the reel mountings 21 rotate through the clutch friction plate 40 and the fast forward main gear 41. The operation of the aforesaid fast forward lever 64 prevents the head 52 and the pinch roller from moving forward. And the rotation of one of the reel mountings 21 makes the tape in the cassette recorder being wound by one of the reel mountings 21 in the direction in which the tape is wound. When the reel mounting 21 is rotated at the time of winding the tape in this fast forward mode, the rotary operation plate 24 is rotated in the similar manner as that in the playback mode, as a result of which, the switching lever 14 whose engaging hole 17 is engaged with the pin 26 is rotated with respect to the shaft 15 counterclockwise in FIG. 1. The engaging portion 13 of this switching lever 14 is moved and brought into contact with the outer peripheral surface of the cam projection edge 9 on the inside of the cam 8 without any contact with the engaging projection 11 of the cam 8. When the tape is wound up by one of the reel mountings 21 to its end in the direction in which the tape is wound, the slippage of the friction plate 40 stops the rotation of one of the reel mountings 21. As a result of this, as described hereinbefore, the relationship between the projection 11 of the cam 8 and the engaging portion 13 of the switching lever 14 makes the fast forward lever 64 return, and then makes the electric motor starting switch 75 turn off to stop the electric motor 1.

In the recording mode by way of operation of the recording lever 61, in the similar manner as that in the aforesaid playback mode, the electric motor 1 is stopped when the winding of the tape is finished.

The fast reverse mode is carried out by the fast reverse lever 63. The operation of this fast reverse lever 63 makes the lock lever 70 move and makes the fast reverse lever 63 keep in the operation state, and makes the switching operation member 67 operate. Thus, the switch operation member 67 turns on the electric motor starting switch 75 so as to start the electric motor 1, as a result of this, as mentioned above, the driving gear 38 is rotated. At this time, the operation of the aforesaid fast forward lever 63 makes the switching rotary plate 36 rotate and makes the fast forward main gear 41 engage with the gear 30 of the other reel mounting 22. And the other reel mounting 22 is rotated without any forward movement of the head 52 and the pinch roller, the tape in the cassette recorder is wound by the other reel mounting 22 in the direction in which the tape is wound.

When the reel mounting 22 is rotated at the time of winding the tape in the fast reverse mode, the rotary operation plate 24 is rotated because the tape is wound from the reel mounting 21, as a result of which, the rotary operation plate 24 is rotated. And the switching lever 14 whose engaging hole 17 is engaged with the pin 26 is rotated centering around the shaft 15 clockwise shown in FIG. 1. The engaging portion 13 of this switching lever 14 is moved and brought into contact with the inner surface of the cam projection edge 10 on the outer side of the cam 8 without any contact with the engaging projection 11 of the cam 8. When the tape is wound up to its end by means of the other reel mounting 22, the rotation of the other reel mounting 22 is stopped by slippage of the friction plate 40, as a result of which, the rotation of the rotary operation plate 24 is also stopped. In this state, the engaging portion 13 is moved and brought into contact with the inner surface of the cam projection edge 10 on the outside of the cam 8. And the engaging portion 13 of the switching lever 14 is so located at the position where the engaging portion 13 is engaged to the projection 11 of the cam 8 in the portion in which the distance between two cam projection edges 9 and 10 is shortened that the switching lever 14 is rotated. The engaging portion 13 is kept its position without any concern to the rotation of the cam 8 which has been continuously rotated. With the engaging portion 13 positioned between two cam projection edges 9 and 10, the cam 8 is rotated so as to stop the electric motor 1 in the similar manner to the mentioned above. In the playback mode, when the pause lever 66 is operated in the pause mode, the switching operation plate 27 is rotated against the force of the spring 51, as a result of which, the playback gear 34 is separated from the playback gear 35 in the driving system.

According to the present invention, the cam acts to return each operation lever by way of stopping rotation of the reel mounting at the time of detection of the end of the tape which has been wound. And this cam arranges the timing of the function of the electric motor starting switch. As a result of this, the structure of this device is more simple than the type in which a mechanism for detecting the stoppage of the rotation of the reel mounting is provided at the position separating from the driving system. Thanks to its simplicity, a compact full automaticshutoff mechanism can be realized in all of modes in which the operation lever can be returned.

I claim:

1. A tape winding end detecting device of a tape recorder wherein the state of operation of an operating lever selected by a selective operation of a plurality of operation levers is maintained by a lock lever and said operation lever is adapted to actuate a switch operation member so as to actuate an electric motor, and rotation of said electric motor causes rotation of one of a pair of reel mountings corresponding to said operation lever selected by way of selective engagement of gears so as to wind a tape by the rotation of said reel mounting, and the stopping of said reel mounting at the end of said tape is detected so as to release said lock lever and return said selected operation lever and also release said switch operation member comprising:

a cam which is provided on a reduced speed rotary body arranged in a driving system from said pair of reel mountings to the electric motor;

a switching lever which is engaged to said cam, and which is adapted to move said lock lever in accordance with the stopping of the rotation of said reel mounting and to release said operation lever;

said electric motor switch operation member being engaged to said cam in such a manner that the return timing of said electric motor switch operation member is arranged to be delayed relative to the return timing of said lock lever.

2. The tape winding end detecting device of a tape recorder according to claim 1, wherein said cam has a large and small cam projecting edges which are formed in a circular shape and in an eccentric manner to each other, and a projection formed at a position of wide interval between these cam projecting edges, and wherein said switching lever has an engaging portion which is adapted to be engaged with said projection of the cam.

* * * * *